（12） United States Patent
Kimura (10) Patent No.: US 10,482,615 B2
(45) Date of Patent: Nov. 19, 2019

(54) IMAGE PROCESSING DEVICE AND IMAGE PROCESSING METHOD (71) Applicant: Panasonic Intellectual Property Management Co., Ltd., Osaka (JP)

(72) Inventor: Masayuki Kimura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 15/892,666

(22) Filed: Feb. 9, 2018

(65) Prior Publication Data

US 2018/0182113 A1 Jun. 28, 2018

Related U.S. Application Data (63) Continuation of application No. PCT/JP2016/003658, filed on Aug. 9, 2016.

(30) Foreign Application Priority Data

Aug. 21, 2015 (JP) ................................. 2015-163391

(51) Int. Cl.
G06K 9/00 (2006.01)
G06T 7/536 (2017.01)

(52) U.S. Cl.
CPC .......... *G06T 7/536* (2017.01); *G06K 9/00791* (2013.01); *G06T 2200/04* (2013.01);
(Continued)

(58) Field of Classification Search
None
See application file for complete search history.

(56) References Cited

U.S. PATENT DOCUMENTS 8,548,229 B2 10/2013 Badino et al.
9,042,639 B2 * 5/2015 Franke ............... G06K 9/00201
382/154

(Continued)

FOREIGN PATENT DOCUMENTS

WO 2015/053100 A1 4/2015

OTHER PUBLICATIONS

Barth et al., "Vehicle tracking at urban intersections using dense stereo" (Year: 2009).*

(Continued)

*Primary Examiner* — Soo Jin Park
(74) *Attorney, Agent, or Firm* — Greenblum & Bernstein, P.L.C.

(57) ABSTRACT

Image processing device (100) includes range image obtaining unit (110), reference surface detector (130), object region detector (140), depth calculator (150), and grouping unit (160). Range image obtaining unit (110) obtains a range image. Reference surface detector (130) detects a reference surface having a predetermined height in the range image. Object region detector (140) detects an object region existing on the reference surface. Depth calculator (150) decides a depth in each vertical line of the object region. Grouping unit (160) calculates a change amount of depth between adjacent vertical lines in the object region, groups a set of vertical lines in which the change amount of depth is less than or equal to a predetermined threshold, and describes each group in a predetermined data format.

16 Claims, 10 Drawing Sheets (52) U.S. Cl.
CPC .............. *G06T 2207/10028* (2013.01); *G06T 2207/30252* (2013.01)

(56) References Cited

U.S. PATENT DOCUMENTS

| | | | |
|---|---|---|---|
| 9,305,219 B2* | 4/2016 | Ramalingam | G06K 9/00791 |
| 9,811,756 B2* | 11/2017 | Liu | G06K 9/4604 |
| 9,928,430 B2* | 3/2018 | Levi | G06K 9/00805 |
| 2016/0217335 A1* | 7/2016 | Levi | G06K 9/00805 |
| 2016/0253575 A1 | 9/2016 | Kakegawa et al. | |
| 2016/0300114 A1* | 10/2016 | Levi | G06K 9/00805 |

OTHER PUBLICATIONS

International Search Report of PCT application No. PCT/JP2016/003658 dated Sep. 20, 2016.

The Extended European Search Report from the European Patent Office (EPO) dated Jun. 15, 2018 for the related European Patent Application No. 16838773.6.

Philip Kelly et al: "Pedestrian Detection Using Stereo and Biometric Information", Jan. 1, 2006 (Jan. 1, 2006), Image Analysis and Recognition Lecture Notes Incomputer Science;;LNCS, Springer, Berlin, DE, pp. 802-813, XP019043839.

* cited by examiner

IMAGE PROCESSING DEVICE AND IMAGE PROCESSING METHOD

TECHNICAL FIELD

The present disclosure relates to an image processing device and an image processing method for efficiently describing a three-dimensional structure of a space.

BACKGROUND ART

A three-dimensional structure is often represented as a point cloud having a three-dimensional coordinate. However, direct use of many pieces of point cloud data is inefficient.

Therefore, there has been proposed a method in which the point cloud data is divided in a certain unit and is structured to reduce a data amount. For example, PTL 1 discloses a technique of representing a region where a forward object exists in a range image obtained by a stereo camera as a group of strip-shaped segments (hereinafter, referred to as "Stixel").

CITATION LIST

Patent Literature

PTL 1: U.S. Pat. No. 8,548,229

SUMMARY OF THE INVENTION

The present disclosure provides an image processing device and an image processing method capable of representing depth continuity in a three-dimensional structure of a space.

An image processing device of the present disclosure includes a range image obtaining unit, a coordinate calculator, a reference surface detector, an object region detector, a depth calculator, and a grouping unit. The range image obtaining unit obtains a range image from a captured image. The coordinate calculator calculates a three-dimensional coordinate in each pixel of the range image. The reference surface detector detects a reference surface having a predetermined height in the range image based on the three-dimensional coordinate of each pixel. The object region detector detects an object region existing on the reference surface in the range image based on the three-dimensional coordinate of each pixel. The depth calculator decides a depth of each vertical line in the object region based on the three-dimensional coordinate of a pixel on a vertical line. The grouping unit calculates a change amount of depth between adjacent vertical lines in the object region, groups a set of vertical lines in which the change amount of depth is less than or equal to a predetermined threshold, and describes each group in a predetermined data format.

An image processing method of the present invention includes a step of obtaining a range image from a captured image. A three-dimensional coordinate in each pixel of the range image is calculated. A reference surface having a predetermined height in the range image is detected based on the three-dimensional coordinate of each pixel. An object region existing on the reference surface is detected in the range image. A depth of each vertical line in the object region is decided based on the three-dimensional coordinate of a pixel on the vertical line. A change amount of depth between adjacent vertical lines is calculated in the object region, a set of vertical lines in which the change amount of depth is less than or equal to a predetermined threshold is grouped, and each group is described in a predetermined data format.

DESCRIPTION OF EMBODIMENTS

Hereinafter, exemplary embodiments will be described in detail with reference to the drawings as appropriate. However, detailed description more than necessary may be omitted. For example, detailed description of a known matter or repetitive description of a substantially identical configuration may be omitted. Such omissions are aimed to prevent the following description from being redundant more than necessary, and to help those skilled in the art easily understand the following description.

Note that the attached drawings and the following description are provided for those skilled in the art to fully understand the present disclosure, and are not intended to limit the subject matter as described in the appended claims.

First Exemplary Embodiment

1. Structure of Stixel

Figure 1:
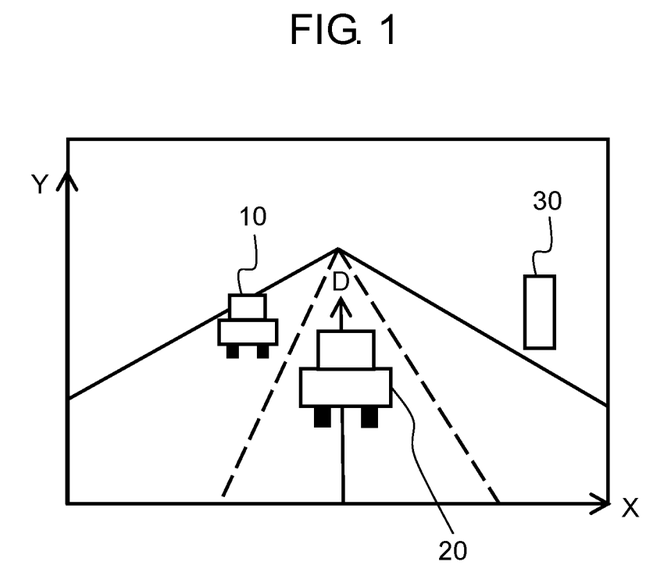
FIG. 1 is a view illustrating an example of a front video of a vehicle.
Figure 2:
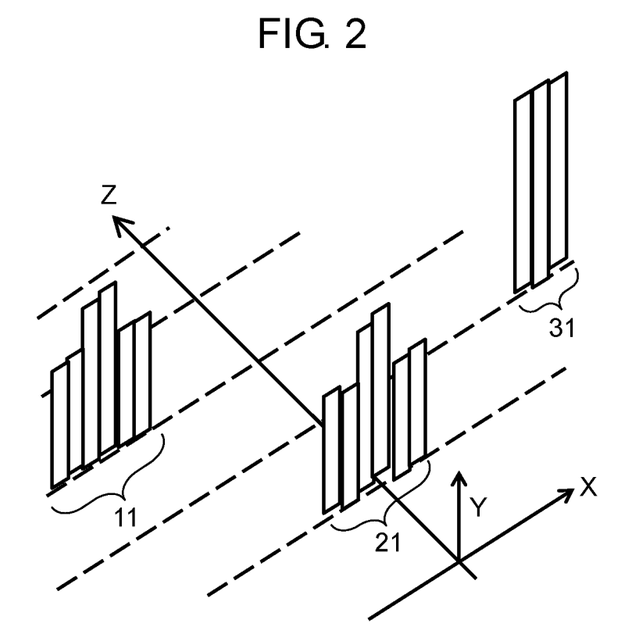
FIG. 2 is a view schematically illustrating a state of generation of Stixels.

FIG. 1 is a view illustrating an example of a front video of a vehicle. In FIG. 1, vehicle 10 is traveling on a left side in front of the vehicle, vehicle 20 is traveling in a center, and building 30 exists on a right side. FIG. 2 is a view schematically illustrating a state of generation of Stixels. FIG. 2 illustrates a case where the video in FIG. 1 is represented using Stixel.

Stixel reduces a data amount without changing a substantial sense by unifying point clouds having substantially equal depth in a vertical direction viewed from a camera into a plate. As illustrated in FIGS. 1 and 2, vehicle 10 is converted into six Stixels 11. At this point, central Stixel has a vertical component larger than Stixels on both sides according to the vertical component of vehicle 10. Similarly, vehicle 20 is converted into six Stixels 21, and building 30 is converted into three Stixels 31.

In FIG. 1, vehicle 20, building 30, and vehicle 10 exist in this order from the front toward the depth along depth direction (z). Accordingly, in FIG. 2, Stixel 21, Stixel 31, and Stixel 11 are disposed in this order from the front toward the depth along depth direction (z).

The structure of Stixel has a problem in that "a scene where a depth continuously changes cannot be successfully described". The problem will be described with reference to FIGS. 3 to 4B.

Figure 3:
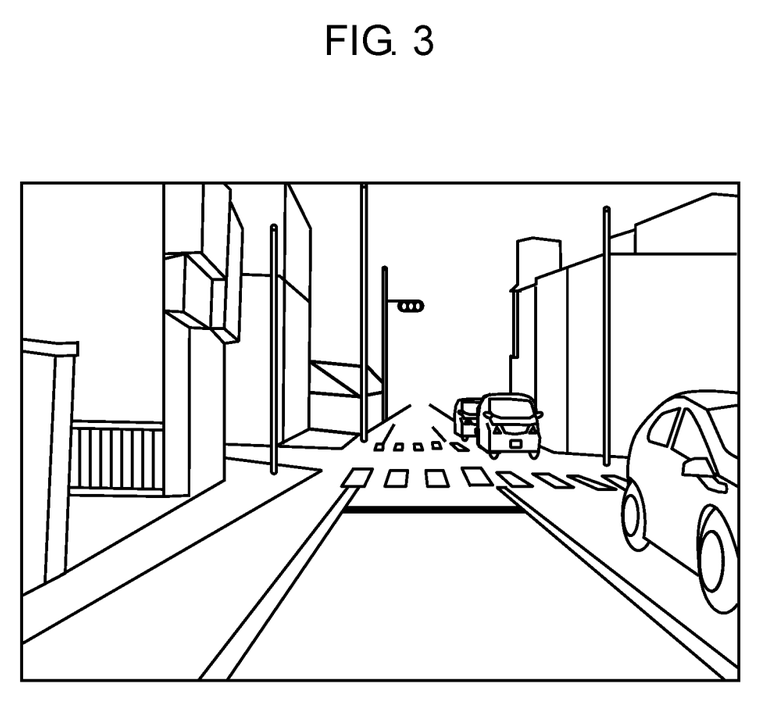
FIG. 3 is a view illustrating another example of the front video of the vehicle.
Figure 4A:
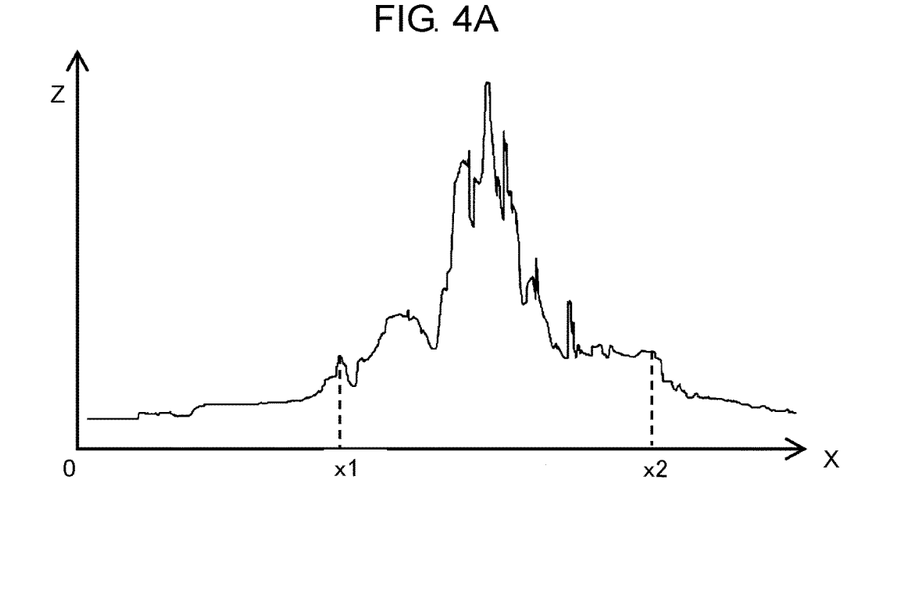
FIG. 4A is a view illustrating a relationship between a lateral direction and a depth direction in a range image generated by capturing the image of FIG. 2.

FIG. 3 is a view illustrating another example of the front video of the vehicle. In FIG. 3, an intersection exists in front of the vehicle (a center portion in FIG. 3), vehicles are traveling in an opposing lane, and buildings exist on both sides of a road. FIG. 4A is a view illustrating a relationship between a lateral direction and a depth direction of the range image generated by capturing the video in FIG. 3. In FIG. 4A, x denotes the lateral direction of the range image, and z denotes the depth direction of the range image.

Figure 4B:
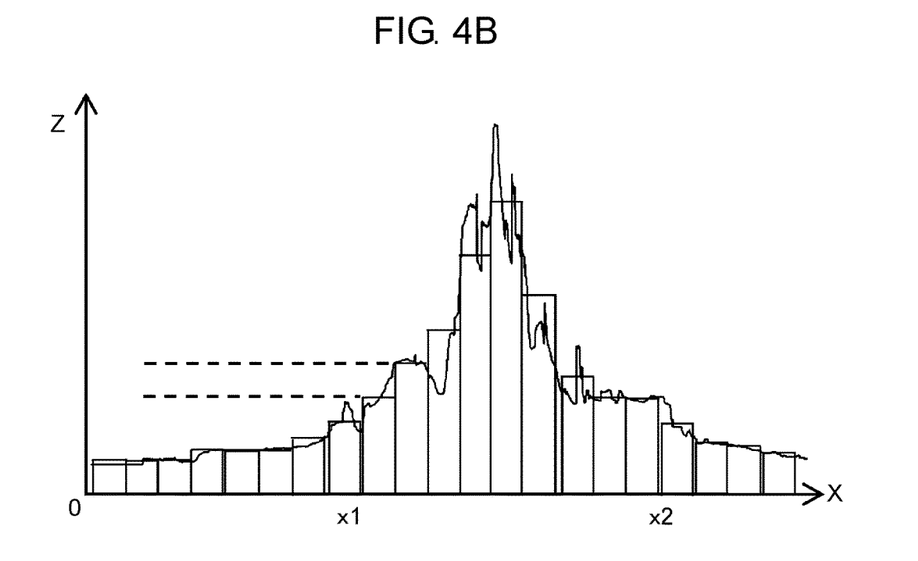
FIG. 4B is a view in which Stixels are generated from the graph in FIG. 4A.

FIG. 4B is a view in which Stixels are generated from the graph in FIG. 4A. As illustrated in FIG. 4B, Stixels are disposed at discontinuous depths. Because Stixel is generated by structuring "the point clouds having the substantially equal depths viewed from the camera", individual Stixel basically faces the camera. This causes a problem when processing of determining the depth continuity is performed.

A case where an intersection exists in front, particularly, a corner to right and left sides exists is considered as a specific example. When the image in FIG. 3 is viewed from the left to the right, the buildings exist at a roadside until the vehicle reaches the intersection, and the building exists at both the roadsides after the vehicle passes the intersection. At this point, in FIG. 4, when the image in FIG. 3 is viewed from the left to the right, point x1 is assumed to be a start point of the intersection, and point x2 is assumed to be an end point of the intersection. In this case, in the depth graph of FIG. 4A, the depth varies at a constant rate in places other than the intersection, and the depth varies quickly at the intersection (a section between point x1 and point x2). This is because, at the intersection, the depth varies from the building at the roadside to the building beyond the road. However Stixel has only one value even if the depth varies at a constant rate or varies quickly. Therefore, the depth of Stixel varies stepwise as illustrated by a dotted line in FIG. 4B. Accordingly, it is difficult to distinguish between a place where the depth varies at a constant rate and a place where the depth varies quickly (near point x1 and point x2), that is, the corner, from the depth information about Stixel. When a width of individual Stixel is narrowed, the discontinuity is relaxed to a certain extent, but a number of Stixels increases. This exerts a reverse effect to reduce a data amount.

Hereinafter, a first exemplary embodiment will be described with reference to FIGS. 5 to 11.

2. Configuration

Figure 5:
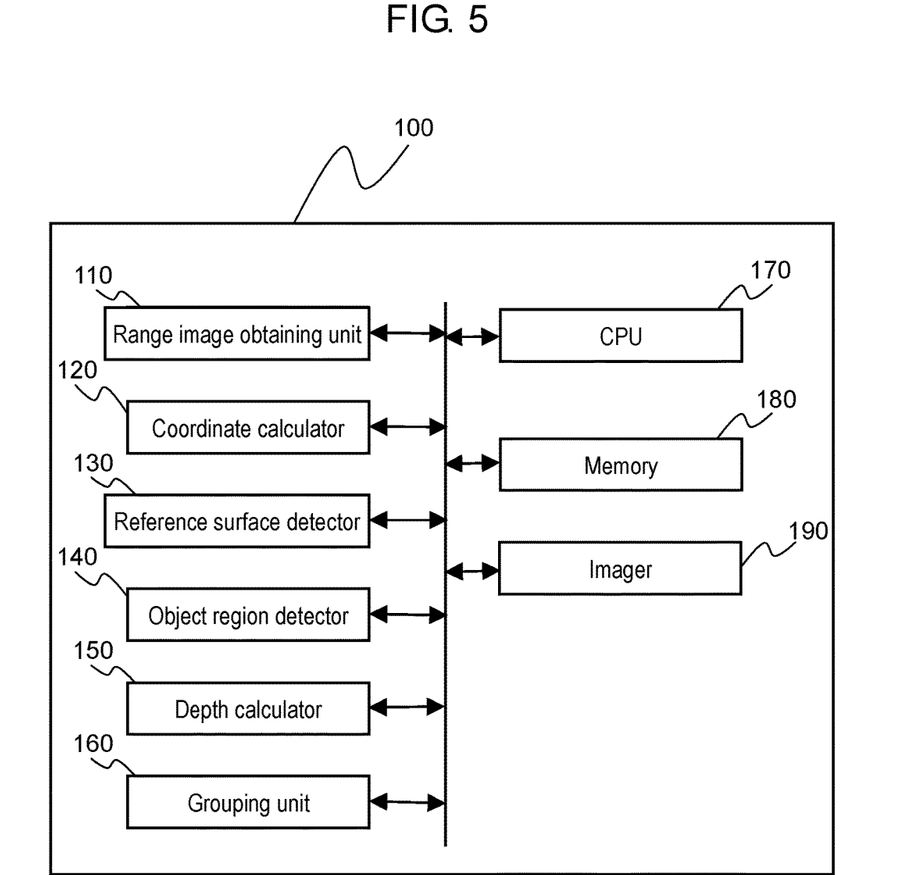
FIG. 5 is a block diagram illustrating a configuration example of an image processing device according to a first exemplary embodiment.

FIG. 5 is a block diagram illustrating a configuration example of an image processing device according to the first exemplary embodiment. Image processing device 100 includes range image obtaining unit 110, coordinate calculator 120, reference surface detector 130, object region detector 140, depth calculator 150, grouping unit 160, CPU 170, memory 180, and imager 190.

Range image obtaining unit 110 obtains the range image representing a distance from imager 190 from a two-dimensional coordinate indicated by each pixel in an image captured by imager 190.

Coordinate calculator 120 calculates a three-dimensional coordinate of each pixel in the range image obtained by range image obtaining unit 110. A method for calculating the three-dimensional coordinate will be described later.

Reference surface detector 130 detects a reference surface such as a ground surface or a road surface in the range image based on the three-dimensional coordinate of each pixel, the three-dimensional coordinate being calculated by coordinate calculator 120. Reference surface detector 130 performs calculation in each vertical line of the range image. Reference surface detector 130 determines whether each pixel in the vertical line is a pixel of the reference surface, and detects the pixel of the reference surface.

Object region detector 140 detects a region of an object existing on the reference surface in the range image based on the three-dimensional coordinate of each pixel, the three-dimensional coordinate being calculated by coordinate calculator 120. Object region detector 140 determines, for each vertical line of the range image, whether a pixel on the vertical line is a pixel of the object existing on the reference surface, and detects an object region.

Depth calculator 150 calculates the depth (including a variation such as an error) in the object region based on the three-dimensional coordinates of each pixel in the object region determined by object region detector 140. In the object region, depth calculator 150 performs depth calculation in each vertical line.

Grouping unit 160 specifies a set of vertical lines (that is, a set of pixels) in which the depth continuously changes based on the change amount of the depth in each vertical line of the object region, and performs grouping in each set. Grouping unit 160 also describes each group in a predetermined data format.

CPU 170 controls whole operation of image processing device 100 including a processing of calculating the three-dimensional coordinate of each pixel in the range image. Hardware such as a DSP (Digital Signal Processor) or an FPGA (Field Programmable Gate Array) may be used to perform various pieces of processing.

Memory 180 is used as a work memory of CPU 170 or to store the range image, and memory 180 is configured by a volatile memory such as a DRAM or a nonvolatile memory such as a flash memory.

For example, imager 190 is an in-vehicle camera, and is attached to a ceiling of a vehicle or an upper surface of a dashboard. Therefore, imager 190 captures a front area of the vehicle. Imager 190 may be attached to an exterior of the vehicle, instead of the interior of the vehicle. For example, imager 190 is configured by a stereo camera or a laser range finder. In the present disclosure, the stereo camera is used as imager 190.

3. Operation

Operation of image processing device 100 having the above configuration will be described below.

Figure 6:
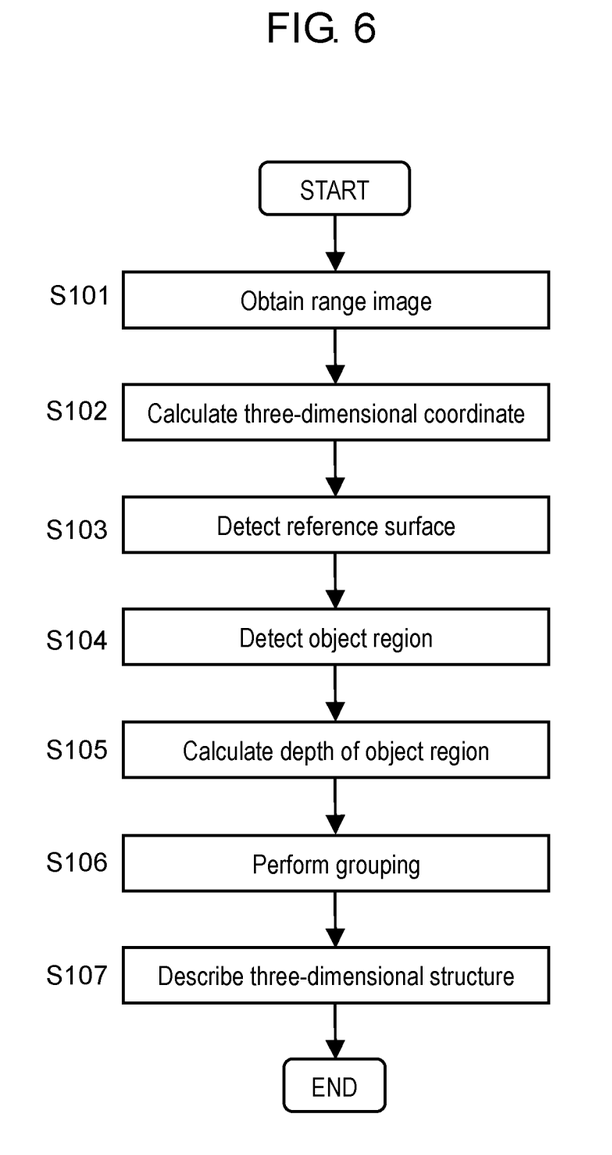
FIG. 6 is a flowchart illustrating a processing flow of the image processing device according to the first exemplary embodiment.

FIG. 6 is a flowchart illustrating a processing flow of image processing device 100 according to the first exemplary embodiment.

Range image obtaining unit 110 captures a pair of stereo images using the stereo camera, and obtains the range image in which magnitude of a parallax (parallax amount) is used as a pixel value (step S101). Calibration of the stereo camera can be performed using an existing method. In addition, an existing method including so-called semi-global matching can be adopted as a method for calculating the parallax, but a method for obtaining the parallaxes for all the pixels as many as possible including a region having a small change in luminance may be preferably adopted.

Then, coordinate calculator 120 calculates the three-dimensional coordinate including the depth of each pixel from the parallax image (step S102).

At this point, a relationship between parallax amount d and depth z can be represented by the following expression.

$$z = \frac{b \cdot f}{d} \qquad \text{[Mathematical Formula 1]}$$

Where b denotes a base length of the stereo camera, that is, an interval between cameras, and f denotes a focal distance of the cameras. In a pixel having the parallax amount of 0, z becomes an infinite value, and this value is interpreted as the representation of what is called an infinite distance.

In the case where depth z is determined, coordinate (x,y) in horizontal and vertical directions can be represented by the following expression.

$$\begin{cases} x = \dfrac{u \cdot z}{f} \\ y = \dfrac{v \cdot z}{f} \end{cases} \qquad \text{[Mathematical Formula 2]}$$

Where u and v are coordinates in horizontal and vertical directions of the pixel in the parallax image with an optical center of an image previously obtained through the calibration (a position through which an optical axis of the camera passes) as an origin.

A coordinate system representing a three-dimensional coordinate (x,y,z) obtained herein sets an optical center of any one of the stereo camera (for example, a left side of the left and right cameras) as the origin, sets an optical axis direction as a z-axis, and sets the horizontal direction and the vertical direction of the image as an x-axis and a y-axis, respectively. Positive directions of the x-axis, the y-axis, and the z-axis are set as a right side, an upper side, and a front side, respectively.

Then, reference surface detector 130 detects the reference surface representing the ground surface or the road surface in the range image based on the three-dimensional coordinate of each pixel, the three-dimensional coordinate being calculated by coordinate calculator 120 (step S103).

Figure 7:
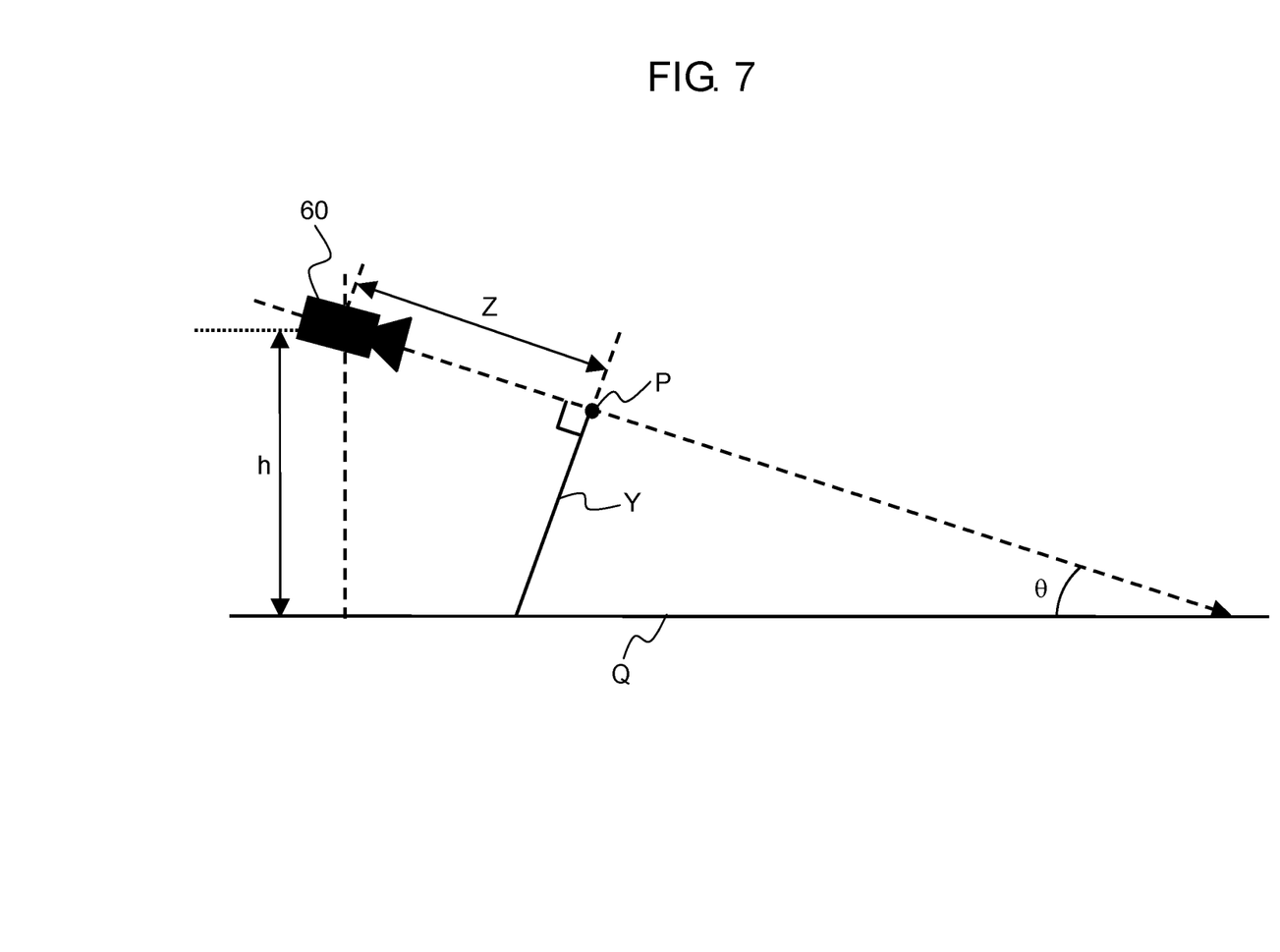
FIG. 7 is a view illustrating a relationship between an optical axis of a camera and a distance of a reference surface.

A specific procedure for estimating a height of the reference surface will be described with reference to FIG. 7. FIG. 7 is a view illustrating a relationship between the optical axis of the camera and the distance of reference surface Q. In FIG. 7, h denotes an installation height of camera 60 and θ denotes a depression angle of the optical axis. Assuming that reference surface Q is flat, for arbitrary point P, distance y from the optical axis to the reference surface with respect to depth z from camera 60 can be expressed by the following expression as illustrated in FIG. 7.

$$Y = \frac{h}{\cos \theta} - z \cdot \tan \theta \qquad \text{[Mathematical Formula 3]}$$

In the case where an object exists at a position of depth z with respect to the three-dimensional coordinate (x,y,z) of a certain pixel, the three-dimensional coordinate (x,y,z) being obtained in step S102, a value of the y-coordinate is larger than −Y obtained by Mathematical Formula 3. Actually, a determination that the pixel in which y falls within a range of −Y to a predetermined threshold belongs to the reference surface in consideration of a possibility that an error is included in the parallax amount (that is, the depth) or the depression angle or a possibility that the actual reference surface is not completely flat.

Figure 8:
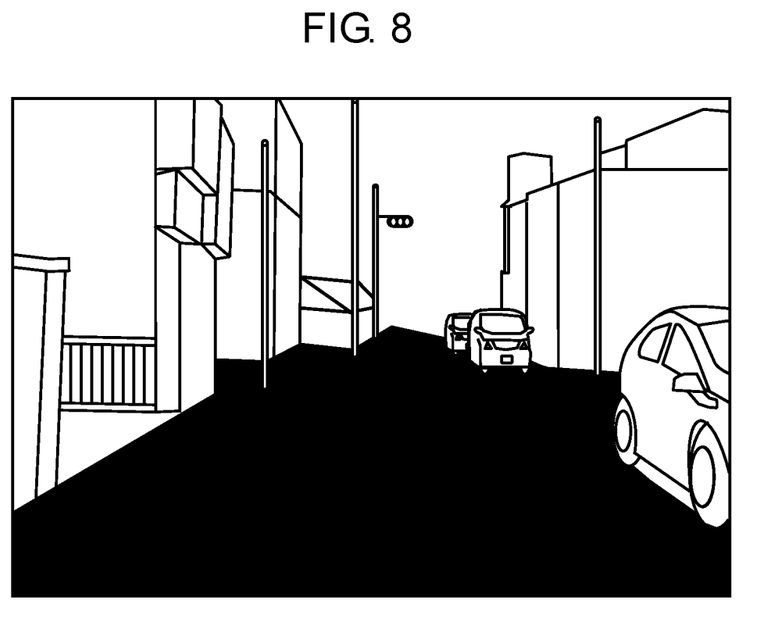
FIG. 8 is a schematic diagram illustrating an example of a detection result of the reference surface.

FIG. 8 is a schematic diagram illustrating an example of a detection result of the reference surface. FIG. 8 illustrates a detection result of the reference surface with respect to the video in FIG. 3, and a black region represents the reference surface.

Then, object region detector 140 detects the object region existing on the reference surface in each vertical line of the range image (step S104).

Figure 9:
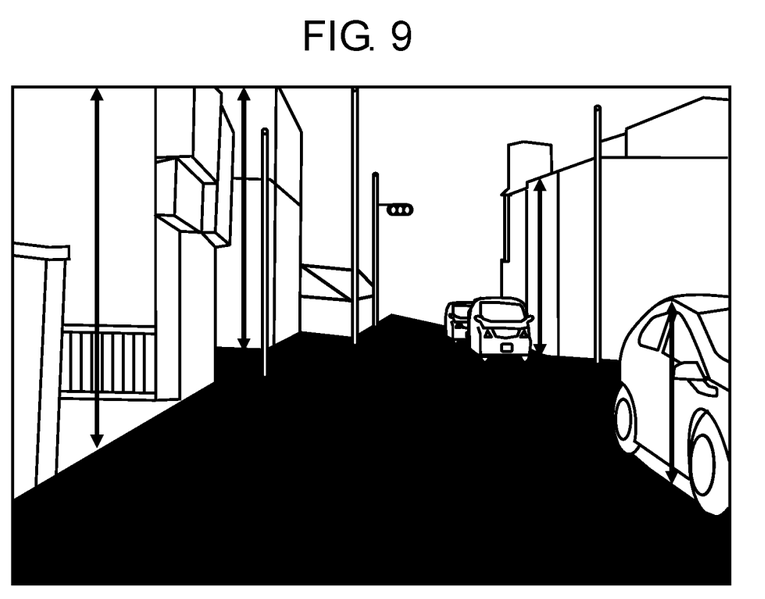
FIG. 9 is a schematic diagram illustrating an example of a detection result of an object region.

Specifically, object region detector 140 scans the pixels toward an upper direction of the image with the pixel at the upper end of the reference surface region in each vertical line as the lower end of the object region of the object, and determines a range where a difference between the depth of the pixel and the depth at the lower end of the object region is less than or equal to a predetermined threshold as the object region. FIG. 9 is a schematic diagram illustrating an example of a detection result of the object region. Each arrow represents the object region in the vertical line. Object region detector 140 may determine that the object does not exist on the line when the depth at the lower end of the object region is sufficiently large (that is, close to the infinite value). In this case, object region detector 140 considers the upper and lower ends of the object region as the same position for convenience.

After the object region is determined, depth calculator 150 calculates the depth of the object region from the depth of each pixel belonging to the object region in each vertical line of the parallax image (step S105).

Specifically, depth calculator 150 performs the calculation by a technique of obtaining an average of the depth of each pixel belonging to the object region in each vertical line. Alternatively, depth calculator 150 may use a weighted average in which a weight increases toward the pixel closer to the lower end of the object region.

In this case, depth calculator 150 may reduce the weight on the pixel closer to a side opposite to the pixel weighted larger. The weighting is used because, when the object region is detected while protruding from the real object region, an influence of the protrusion is reduced. That is, when the object region protrudes to the upper side in the usual (the upper portion of the image becomes upward in the vertical direction) disposition, the depth becomes infinite in the case where the object does not exist on the depth side, and the depth is often largely separated from the real depth of the object region even if the object exists on the depth side. On the other hand, when the object region protrudes to the lower side, a possibility that the depth is largely separated from the real depth of the object region is very low because the lower side is the road surface. Therefore, when an average is calculated, it is considered that a depth error increases in the case where the object region protrudes to the upper side. Accordingly, the error can be reduced by calculating a weighted average in which the lower side is weighted larger.

In the case where the camera is installed upside down (the upper portion of the image becomes downward in the vertical direction), the similar effect can be obtained by weighting the upper side larger.

Then, grouping unit 160 calculates a change amount of depth between the adjacent vertical lines in the object region, and groups a set of vertical lines (that is, a set of pixels on the vertical lines) in which the change amount of depth is less than or equal to a predetermined threshold (step S106). As to a method for deciding the threshold, for example, the threshold can be determined according to the depth of each vertical line. Because an inverse proportional relationship between depth z and parallax amount d holds from Mathematical Formula 1, the parallax amount increases with increasing depth. Accordingly, it is natural that the threshold increases with increasing depth. Alternatively, change amount of depth $\Delta z$ in which error $\pm \Delta d$ is added to parallax amount d can be obtained from Mathematical Formula 1, and the threshold may be decided based on change amount of depth $\Delta z$.

The threshold may be determined according to detection error amounts of the depth of each vertical line and the depth of the range image.

Even if the change amount of depth exceeds the threshold in certain vertical line L during the grouping, grouping unit 160 may not set vertical line L as a group boundary in the case where the depth comes close to the depth of vertical line L until a constant line. Therefore, in the case where the error is generated in the depth of the specific vertical line or in the case where a thin object such as a pole is standing in front of the vehicle, the group can be configured while the error or the thin object is ignored.

In grouping unit 160, the thresholds having different values may be used in the case where the depth changes from the front to the depth between the adjacent vertical lines and the case where the depth changes from the depth to the front. For example, when a straight road in which the buildings are continuously standing on the roadside is assumed as illustrated in FIG. 3, the depth of the object region changes roughly from the front to the depth (when viewed from the left to the right) on the left side of the image, and the depth of the object region changes roughly from the depth to the front on the right side of the image. Accordingly, in the case where the depth changes from the depth to the front on the left side of the image (the depth changes from the front to the depth on the right side of the image), it is considered that a protruded object exists in the front or that the depth of the object region is false. In such cases, the threshold is changed according to a change direction of the depth, which allows prevention of the false grouping.

Finally, grouping unit 160 describes each grouped set (group) in the predetermined data format (step S107). A plurality of methods are considered as the data format. For example, it is conceivable that each grouped set is represented by the three-dimensional coordinates for four points including upper ends and lower ends of the object region at both ends of each group. Each group is represented as a plane in a three-dimensional space configured by the four points, which is particularly effective in performing certain processing in the three-dimensional space (for example, in determining which place in the space is obstructed by the object).

Alternatively, it is conceivable that each grouped set is represented by a two-dimensional coordinate on the range image of the four points including the upper ends and lower ends of the object regions at both ends of each group and the depths of the object region at both the ends of the object region. This is effective in performing certain processing while particularly focusing on the group boundary on the range image (for example, in performing comparison to an adjacent line). In the representing format, the depth of each line except for both the ends of the object region may be corrected using a value obtained by the linear interpolation of the depths at both the ends of the object region.

Figure 10:
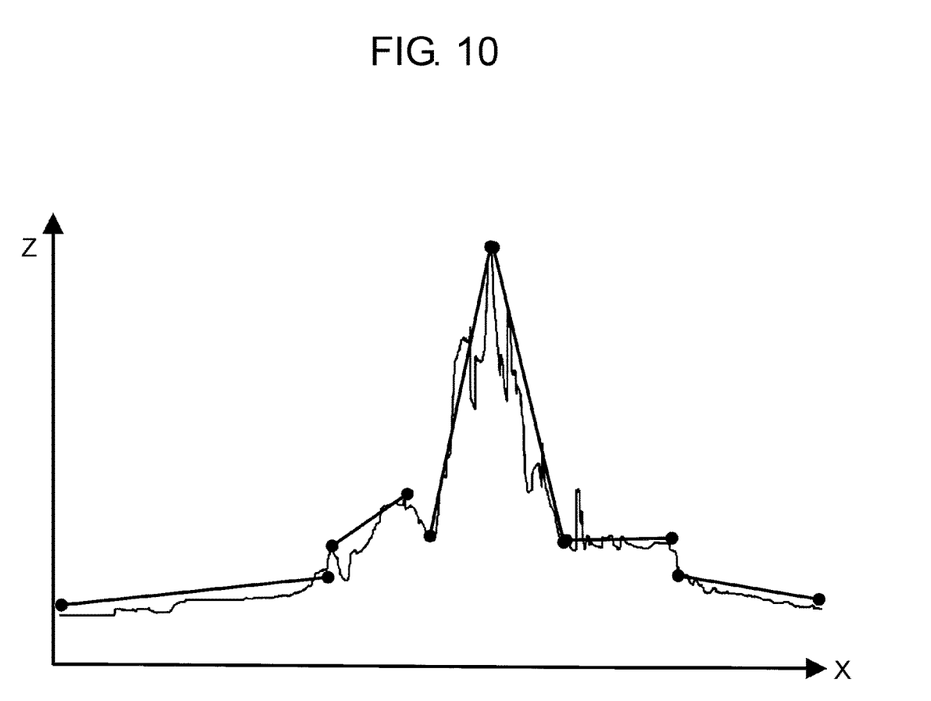
FIG. 10 is a schematic diagram illustrating an example of a grouping result of the object region.

FIG. 10 is a schematic diagram illustrating an example of a grouping result of the object region. Specifically, FIG. 10 is a view schematically illustrating a result of linear interpolation of the depth in the latter representing format. On the graph, a solid line having circles at both ends represents each group. In FIG. 10, the object region is grouped into six groups. Thus, the depth continuity that cannot be represented in FIG. 4B can be represented in FIG. 10. In FIG. 4B, the three-dimensional structure represented by 21 Stixels can be represented by six groups, and the data amount can also be reduced.

4. Method for Using Grouping Result

As an example in which information about the object region is used, a gap of the structure such as the building is detected, and an entry region (the region which a vehicle can enter, for example a road, parking area, and so on).

Figure 11:
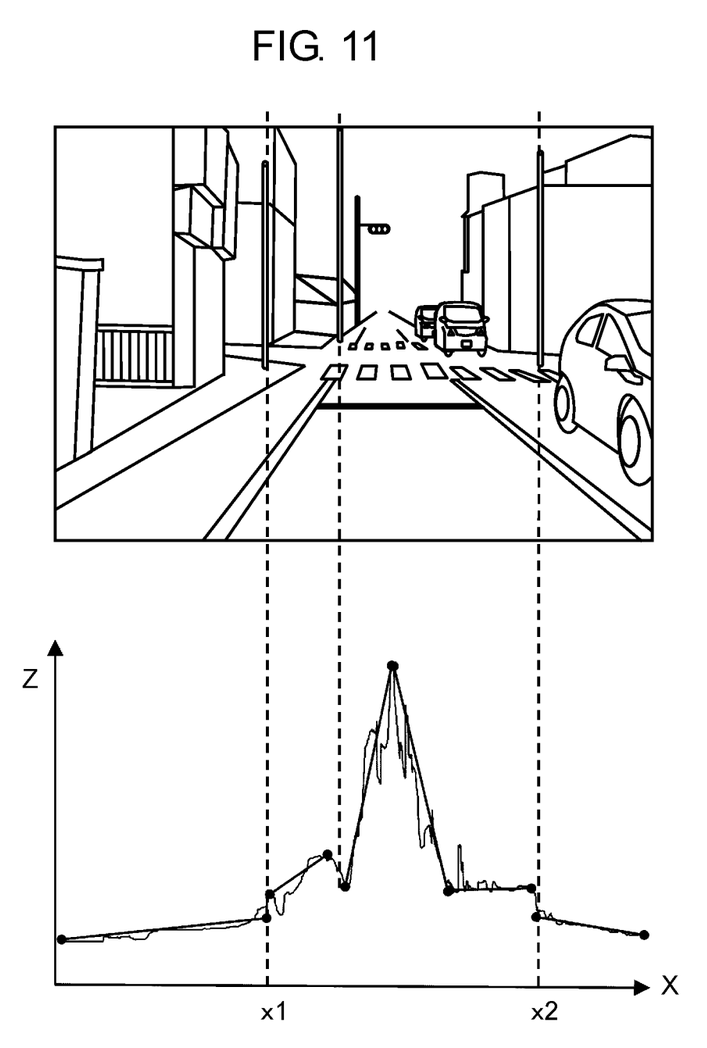
FIG. 11 is a view in which the grouping result of the object region and a front scene are correlated with each other.

FIG. 11 is a view in which the grouping result of the object region in FIG. 10 and the front scene image in FIG. 3 are correlated with each other. When scanning the graph of FIG. 10 from the left to the right, it is considered that a place where the depth changes largely, if there is a place where the depth of the left end of the next group adjacent to the right end of a certain group is large, correspond to the gap of the structure such as a building which faces a road. In FIG. 11, a dotted line is drawn in order that a place where the depth in FIG. 10 changes largely is correlated with FIG. 3, and three gaps are detected. As a method for determination whether the detected gap is an actual entry region such as a road, one having a depth change within a predetermined range presumed from the width of a general road and the number of lanes is regarded as an actual entry region. When the depth change exceeds the predetermined range, it is considered that there is a high possibility that the space is not a road but an open space such as a ground. A method for further detailed determination is for detecting a self-position of a vehicle in which the image processing device is mounted using a GNSS (Global Navigation Satellite System) and matching the self-position with cartographic information, for example.

At this point, the self-position held by the GNSS can also be corrected by matching information about the detected entry region with the cartographic information. In the self-position held by the GNSS, various errors are accumulated with time or according to an environment. On the other hand, the position of the detected entry region does not include the error with time or according to the environment because the position of the detected entry region is detected from the self-position at a moment imager 190 captures the image. Accordingly, a displacement of the self-position can be detected from the information about the detected entry region and positional information about the entry region on a map. For example, in the case where the detected entry region exists 22 meters ahead although the intersection exists 20 meters ahead on the map, the determination is made that the self-position held by the GNSS is displaced forward from the self-position by 2 meters, and the self-position held by the GNSS is corrected to a position that is 2 meters behind.

The above formulation can be represented as follows. Assuming that n entry regions are detected, the three-dimensional positions are represented by $X_1=(x_1,y_1,z_1)$, $X_2=(x_2,y_2,z_2), \ldots, X_n=(x_n,y_n,z_n)$. Then, probability P(X) that the entry region exists at certain position X=(x,y,z) is defined. For example, probability P(X) can be obtained by a method for obtaining a sum of a Gaussian distribution centered at $X_k$ (1≤k≤n, the same applies hereinafter) or a method for assigning a constant value to a range where a distance from $X_k$ is constant. Similarly, probability Q(X) that the intersection exists at certain position X is determined based on the cartographic information. Q(X) can be uniquely determined from the self-position held by the GNSS.

A correction amount of the self-position is set to X'=(x', y',z'). Value X' to be obtained maximizes a value determined by the following expression.

$$\int P(X-X')*Q(X)dX \qquad \text{[Mathematical Formula 4]}$$

It is necessary to set a range of X to a finite value in calculating Mathematical Formula 4. Therefore, for example, a constant range determined by a view angle of imager 190 is desirably used. Additionally, while the number of necessary calculation times increases with decreasing change amount of X', an residual error after the correction increases when the change amount of X' increases (for example, assuming that the change amount is a 1-meter unit, the residual error less than 1 meter is generated). Therefore, it is necessary to determine the change amount of X' according to a processing speed and an acceptable residual error.

5. Effects and the Like

In image processing device 100 of the present disclosure, coordinate calculator 120 calculates the three-dimensional coordinate of each pixel in the range image obtained by range image obtaining unit 110. Reference surface detector 130 detects the reference surface having the predetermined height in the range image based on the three-dimensional coordinate of each pixel, and object region detector 140 detects the object region existing on the reference surface in the range image based on the three-dimensional coordinate of each pixel. Depth calculator 150 decides the depth in each vertical line of the object region based on the three-dimensional coordinate of the pixel on the vertical line. Grouping unit 160 calculates the change amount of depth between the adjacent vertical lines in the object region, groups the set of vertical lines in which the change amount of depth is less than or equal to the predetermined threshold, and describes each group in the predetermined data format.

Therefore, in the object region, a set of vertical lines in which the change amount of depth is substantially kept constant (that is, the depth changes continuously) is grouped as one set.

Accordingly, the continuity of the depth of the image in which the front scene is captured can be represented, and the data amount can be reduced.

Other Exemplary Embodiments

As described above, the first exemplary embodiment is described as illustration of the technique disclosed in this application. Accordingly, in order to exemplify the above technique, the accompanying drawings and the detailed description include not only components that are essential for solving problems, but also components that are not essential for solving the problems. Therefore, it should not be recognized that the component that are not essential are essential even if the components are described in the accompanying drawings and the detailed description.

The technique of the present disclosure is not limited to the first exemplary embodiment, but can be applied to exemplary embodiments where modifications, replacements, additions, and omissions are appropriately made. Additionally, components described in the first exemplary embodiment can be combined to configure a new exemplary embodiment.

Other exemplary embodiments will be described below.

In the present disclosure, the stereo camera is used as imager 190. Alternatively, an imaging device that captures a color image or a grayscale image in which the range image and the positional relationship between the pixels are correlated with each other may be used as imager 190. Therefore, color (or luminance) information can be obtained together with the range information, and the color information can be used in the grouping processing. An example of a specific color information using method may include the weighting of the threshold during the grouping according to a difference in color or luminance of the object region between the adjacent vertical lines. In the case where the difference in color between the adjacent object regions is extremely small, there is a high possibility that the adjacent object regions are the same object, and there is a high possibility of a noise influence even if the depth varies. Accordingly, for the small difference in color, an increase of the threshold of the grouping (hardly determined to be a boundary) is effective.

Figure 12:
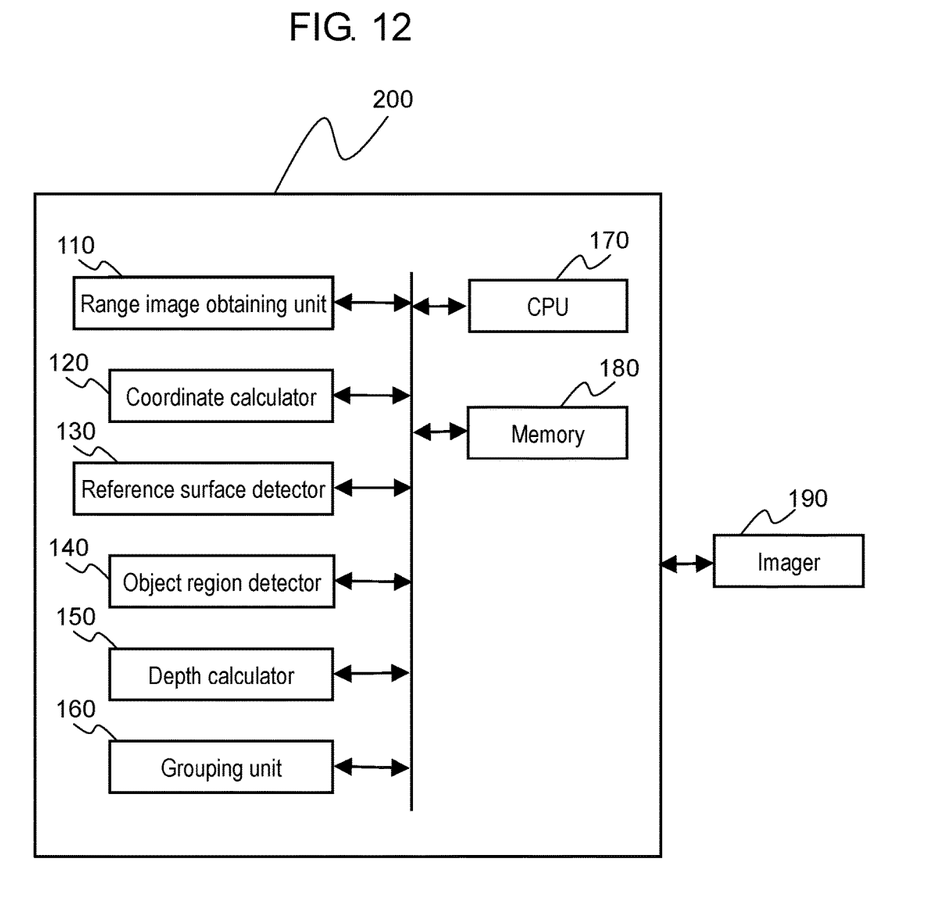
FIG. 12 is a block diagram illustrating a configuration example of an image processing device according to another exemplary embodiment.

In the present disclosure, image processing device 100 includes imager 190. However, imager 190 may be a separate unit from the image processing device 100. FIG. 12 is a block diagram illustrating another configuration example of the image processing device. In FIG. 12, the component that performs operation similar to that in FIG. 5 is designated by the same reference mark, and the description will be omitted.

As illustrated in FIG. 12, image processing device 200 includes range image obtaining unit 110, coordinate calculator 120, reference surface detector 130, object region detector 140, depth calculator 150, grouping unit 160, CPU 170, and memory 180. Imager 190 and image processing device 200 can communicate with each other. Image processing device 200 obtains the image captured by imager 190 using a wired or wireless communication.

In the image processing device of the present disclosure, each block may be formed into one chip using a semiconductor device such as an LSI, or formed into one chip so as to include a part of or all of the image processing device.

In this case, the term of LSI is used. The LSI is also called an IC, a system LSI, a super LSI, and an ultra LSI depending on a degree of integration.

An integrated circuit technique is not limited to the LSI, but the integrated circuit technique may be achieved by a dedicated circuit or a general-purpose processor. The programmable FPGA or a reconfigurable processor in which connection or setting of a circuit cell in the LSI can be reconfigured may be used after the LSI is manufactured.

When an integrated circuit technology replacing the LSI by the progress of the semiconductor technology or another technology derived from the semiconductor technology emerges, the function block may be integrated using the integrated circuit technology. Possibly, a biotechnology can be applied to the integrated circuit technology.

Each piece of processing of the above exemplary embodiments may be performed by hardware or software. Each piece of processing of the above exemplary embodiments may be performed by a combination of the hardware and the software. In the above exemplary embodiments, detailed timing adjustment of various signals generated in actual hardware design is omitted for convenience of description.

Additionally, in the case where each piece of processing of the exemplary embodiments is performed by software, a part of or all of the pieces of processing may be performed by hardware. As a specific form, in the exemplary embodiments, part of the information held by the image processing device or a part of the pieces of processing performed by the image processing device may be held and performed on a server side through a network. In response to a request from the image processing device, a part of the pieces of processing is performed by a server, and processing result is returned to the image processing device as a response, whereby the function similar to that described above may be implemented.

In addition to the technique described in the present disclosure, any known technique may be used in each step of the processing of detecting the reference surface or the processing of detecting the object region.

INDUSTRIAL APPLICABILITY

The present invention can be applied to the image processing device and the image processing method for describing the three-dimensional structure of the front space and performing various pieces of processing based on the three-dimensional structure of the front space.

REFERENCE MARKS IN THE DRAWINGS

100, 200 image processing device
110 range image obtaining unit
120 coordinate calculator
130 reference surface detector
140 object region detector
150 depth calculator
160 grouping unit
170 CPU
180 memory
190 imager

The invention claimed is:
1. An image processing device, comprising:
   a memory that stores a range image from a captured image; and
   a processor that performs operations including:
      calculating a three-dimensional coordinate in each pixel of the range image;
      detecting a reference surface having a predetermined height in the range image based on the three-dimensional coordinate of each pixel;
      detecting an object region existing on the reference surface in the range image based on the three-dimensional coordinate of each pixel;
      deciding, for determining a depth of the object region, a depth of each vertical line in the object region based on the three-dimensional coordinate of a pixel on the vertical line;
      calculating a change amount of depth between adjacent vertical lines in the object region;
      grouping a set of vertical lines in which the change amount of depth is less than or equal to a predetermined threshold;
      describing each group in a predetermined data format; and
      determining an entry region as a place where a difference of depths between a right end of a certain group and a left end of an adjacent group is within a predetermined range.

2. The image processing device according to claim 1, wherein the processor describes each group by three-dimensional coordinates for four points including upper ends and lower ends of the vertical lines at both ends of the group.

3. The image processing device according to claim 2, wherein the processor calculates an average value of a depth of each pixel included in the object region as the depth of the object region.

4. The image processing device according to claim 1, wherein the processor describes each group by two-dimensional coordinates on the range image for four points including upper ends and lower ends of the vertical lines at both ends of the group and depths of regions at both of the ends of the group.

5. The image processing device according to claim 4, wherein the processor calculates an average value of a depth of each pixel included in the object region as the depth of the object region.

6. The image processing device according to claim 1, wherein the processor describes each group by two-dimensional coordinates on the range image for four points including upper ends and lower ends of the vertical lines of each group and the depth of each vertical line obtained by linear interpolation of depths of regions at both of the ends of the group.

7. The image processing device according to claim 6, wherein the processor calculates an average value of a depth of each pixel included in the object region as the depth of the object region.

8. The image processing device according to claim 1, wherein the processor increases weighting of a pixel closer to an upper end or a lower end of regions at both ends of a group, and calculates a weighting average of a depth of each pixel as the depth of the object region.

9. The image processing device according to claim 1, wherein the predetermined threshold is determined according to the depth of each vertical line.

10. The image processing device according to claim 1, wherein the predetermined threshold is determined according to the depth of each vertical line and a detection error amount of a depth of the range image.

11. The image processing device according to claim 1, wherein, different values are used as the predetermined threshold in a case where the depth of the object region changes from a front toward a depth between the adjacent vertical lines when viewed from a left to a right and a case where the depth of the object region changes from the depth toward the front.

12. The image processing device according to claim 1, further comprising:
   a camera that captures the image,
   wherein the camera captures a color image or a grayscale image in which the range image is correlated with a positional relationship between pixels, and
   the processor weights the predetermined threshold according to a difference in color or luminance of the object region between the adjacent vertical lines.

13. The image processing device according to claim 1, wherein the processor calculates a correction amount, for correcting an error of a self-position, by comparing a position of the entry region and cartographic information.

14. An image processing method, comprising:
   obtaining a range image from a captured image;
   calculating a three-dimensional coordinate in each pixel of the range image;

detecting a reference surface having a predetermined height in the range image based on the three-dimensional coordinate of each pixel;

detecting an object region existing on the reference surface in the range image based on the three-dimensional coordinate of each pixel;

deciding a depth of each vertical line in the object region based on the three-dimensional coordinate of a pixel on the vertical line;

calculating a change amount of depth between adjacent vertical lines in the object region;

grouping a set of vertical lines in which the change amount of depth is less than or equal to a predetermined threshold;

describing each group in a predetermined data format; and determining an entry region as a place where a difference of depths between a right end of a certain group and a left end of an adjacent group is within a predetermined range.

15. An image processing device, comprising:

a range image obtaining unit that obtains a range image from a captured image;

a coordinate calculator that calculates a three-dimensional coordinate in each pixel of the range image;

a reference surface detector that detects a reference surface having a predetermined height in the range image based on the three-dimensional coordinate of each pixel;

an object region detector that detects an object region existing on the reference surface in the range image based on the three-dimensional coordinate of each pixel;

a depth calculator that decides a depth of each vertical line in the object region based on the three-dimensional coordinate of a pixel on the vertical line; and a grouping unit that calculates a change amount of depth between adjacent vertical lines in the object region, groups a set of vertical lines in which the change amount of depth is less than or equal to a predetermined threshold, and describes each group in a predetermined data format, wherein the grouping unit determines that a place where a difference of depth between a right end of a certain group and a left end of an adjacent group falls within a predetermined range as an entry region.

16. The image processing device according to claim 15, wherein a correction amount correcting an error of a self-position is calculated by comparing a position of the entry region and cartographic information.

* * * * *